(12) United States Patent
Fala et al.

(10) Patent No.: US 11,269,505 B2
(45) Date of Patent: Mar. 8, 2022

(54) SYSTEM AND METHODS FOR ENTITY VISUALIZATION AND MANAGEMENT WITH AN ENTITY NODE EDITOR

(71) Applicant: Johnson Controls Technology Company, Auburn Hills, MI (US)

(72) Inventors: Federico Fala, Cork (IE); Nicolae Bogdan Pavel, Cork (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/723,087

(22) Filed: Dec. 20, 2019

(65) Prior Publication Data

US 2020/0133472 A1 Apr. 30, 2020

Related U.S. Application Data

(63) Continuation of application No. 16/175,507, filed on Oct. 30, 2018.

(51) Int. Cl.
*G06F 15/177* (2006.01)
*G06F 3/04847* (2022.01)
(Continued)

(52) U.S. Cl.
CPC ....... *G06F 3/04847* (2013.01); *G05B 19/042* (2013.01); *G06F 3/0482* (2013.01); *G05B 2219/25011* (2013.01)

(58) Field of Classification Search
CPC .. G06F 3/04847; G06F 3/0481; G06F 3/0482; G05B 19/042; G05B 2219/25011
See application file for complete search history.

(56) References Cited

U.S. PATENT DOCUMENTS 6,381,611 B1 * 4/2002 Roberge ................ G16H 10/60
707/797
7,797,276 B1 9/2010 Yang
(Continued)

FOREIGN PATENT DOCUMENTS

AU 2019226217 A1 11/2020
AU 2019226264 A1 11/2020
(Continued)

OTHER PUBLICATIONS

Balaji et al, Brick: Metadata schema for portable smart building applications, dated Sep. 25, 2017, 20 pages.
(Continued)

*Primary Examiner* — Nicholas Augustine
(74) *Attorney, Agent, or Firm* — Foley & Lardner LLP

(57) ABSTRACT

A method for visualizing and managing entities and connections between entities based on a graphical user interface (GUI) node editor includes constructing an entity datablock, wherein the entity datablock is a data structure describing an entity and comprises entity descriptive information, an entity category, an entity name, entity relationships, and an entity identifier. The method includes establishing the entity relationships as bi-directional relationships, wherein the bi-directional relationships link two disparate entities. The method further includes representing the entity datablock as a node and the bi-directional relationships as lines connecting two nodes, wherein the node comprises at least one of the entity descriptive information, the entity category, or the entity name.

20 Claims, 7 Drawing Sheets

(51) Int. Cl.
  *G05B 19/042* (2006.01)
  *G06F 3/0482* (2013.01)
  *G06F 3/048* (2013.01)

(56) References Cited

U.S. PATENT DOCUMENTS

| | | |
|---|---|---|
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,788,097 B2 | 7/2014 | Drees et al. |
| 8,843,238 B2 | 9/2014 | Wenzel et al. |
| 9,196,009 B2 | 11/2015 | Drees et al. |
| 9,286,582 B2 | 3/2016 | Drees et al. |
| 9,354,968 B2 | 5/2016 | Wenzel et al. |
| 9,753,455 B2 | 9/2017 | Drees |
| 9,811,249 B2 | 11/2017 | Chen et al. |
| 10,171,297 B2 | 1/2019 | Stewart et al. |
| 10,514,963 B2 | 12/2019 | Shrivastava et al. |
| 10,564,993 B2 | 2/2020 | Deutsch et al. |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,921,760 B2 | 2/2021 | Harvey |
| 10,969,133 B2 | 4/2021 | Harvey |
| 11,041,650 B2 | 6/2021 | Li et al. |
| 11,054,796 B2 | 7/2021 | Holaso |
| 2004/0128314 A1 | 7/2004 | Katibah et al. |
| 2004/0153446 A1* | 8/2004 | Castronova ........... G06F 3/0485 |
| 2005/0108262 A1 | 5/2005 | Fawcett et al. |
| 2006/0053382 A1* | 3/2006 | Gardner ................ G06F 3/0482 |
| | | 715/764 |
| 2009/0063545 A1 | 3/2009 | Hsu et al. |
| 2010/0281387 A1 | 11/2010 | Holland et al. |
| 2011/0087988 A1 | 4/2011 | Ray et al. |
| 2011/0093493 A1 | 4/2011 | Nair et al. |
| 2013/0007063 A1 | 1/2013 | Kalra et al. |
| 2013/0204836 A1 | 8/2013 | Choi et al. |
| 2013/0338970 A1 | 12/2013 | Reghetti |
| 2014/0129457 A1 | 5/2014 | Peeler |
| 2015/0019174 A1* | 1/2015 | Kiff ........................ G06Q 10/06 |
| | | 703/1 |
| 2015/0046180 A1 | 2/2015 | Futscher De Deus et al. |
| 2015/0295796 A1 | 10/2015 | Hsiao et al. |
| 2015/0324422 A1 | 11/2015 | Elder |
| 2015/0341212 A1 | 11/2015 | Hsiao et al. |
| 2016/0210268 A1* | 7/2016 | Sales ................... G06F 3/04842 |
| 2016/0247129 A1 | 8/2016 | Song et al. |
| 2016/0260063 A1 | 9/2016 | Harris et al. |
| 2016/0357424 A1* | 12/2016 | Pang ....................... H04L 45/66 |
| 2016/0357521 A1 | 12/2016 | Zhang et al. |
| 2016/0359680 A1* | 12/2016 | Parandehgheibi .... G06T 11/206 |
| 2017/0039255 A1 | 2/2017 | Raj et al. |
| 2017/0075984 A1 | 3/2017 | Deshpande et al. |
| 2017/0177715 A1 | 6/2017 | Chang et al. |
| 2017/0206242 A1* | 7/2017 | Djordjevic ............ G06F 16/248 |
| 2017/0212482 A1 | 7/2017 | Boettcher et al. |
| 2017/0212668 A1 | 7/2017 | Shah et al. |
| 2017/0357225 A1 | 12/2017 | Asp et al. |
| 2017/0357490 A1 | 12/2017 | Park et al. |
| 2017/0364841 A1 | 12/2017 | Kurjanowicz et al. |
| 2018/0262573 A1* | 9/2018 | Przybylski .............. G05B 15/02 |
| 2018/0356775 A1 | 12/2018 | Harvey |
| 2018/0359111 A1 | 12/2018 | Harvey |
| 2019/0095395 A1* | 3/2019 | Piecko .................... G06F 16/26 |
| 2019/0095519 A1* | 3/2019 | Park ...................... G06F 16/2228 |
| 2019/0121801 A1 | 4/2019 | Jethwa et al. |
| 2019/0364060 A1* | 11/2019 | Muddu ............... H04L 63/1408 |
| 2019/0377306 A1 | 12/2019 | Harvey |
| 2020/0125249 A1 | 4/2020 | Park et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0043221 A1 | 2/2021 | Yelchuru et al. |
| 2021/0325070 A1 | 10/2021 | Endel et al. |
| 2021/0342961 A1 | 11/2021 | Winter et al. |

FOREIGN PATENT DOCUMENTS

| | | |
|---|---|---|
| AU | 2019351573 A1 | 5/2021 |
| CN | 104572125 B | 10/2018 |
| EP | 3 268 821 B1 | 1/2018 |
| WO | WO-2006/091521 A2 | 8/2006 |
| WO | WO-2011/100255 A2 | 8/2011 |
| WO | WO-2017/132718 A1 | 8/2017 |
| WO | WO-2018/132112 A1 | 7/2018 |
| WO | WO-2020/061621 A1 | 4/2020 |

OTHER PUBLICATIONS

Balaji et al, Brick: Towards a Unified Metadata Schema for Buildings, dated Nov. 16-17, 2016, 10 pages.
Balaji et al, Demo Abstract: Portable Queries Using the Brick Schema for Building Applications, dated Nov. 16-17, 2016, 2 pages.
Brick: Towards a Unified Metadata Schema for Buildings, dated Nov. 16, 2016, 46 pages.
Building Blocks for Smart Buildings, BrickSchema.org, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, 67 pages.
Fierro, Writing Portable Building Analytics with the Brick Metadata Schema, UC Berkeley ACM E-Energy, 39 pages, dated 2019.
Gao et al., A large-scale evaluation of automated metadata inference approaches on sensors from air handling units, dated May 1, 2018, pp. 13-40.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
Koh et al., Plaster: An Integration, Benchmark, and Development Framework for Metadata Normalization Methods, dated Nov. 7-8, 2018, 10 pages.
Koh et al., Scrabble: Transferrable Semi-Automated Semantic Metadata Normalization using Intermediate Representation, dated Nov. 7-8, 2018, 10 pages.
Koh et al., Who can Access What, and When?, dated Nov. 13-14, 2019, 4 pages.
Metadata Schema for Buildings, 3 pages, Brickschema.org.
Short Paper: Analyzing Metadata Schemas for Buildings—The Good, The Bad, and the Ugly, 4 pages.
Bhattacharya et al., Short Paper: Analyzing Metadata Schemas for Buildings—The Good, The Bad and the Ugly, ACM, Nov. 4-5, 2015, 4 pages.
Blender 2.79 Manual, Introduction to Nodes, https://docs.blender.org/manual/en/dev/render/blender_render/materials/nodes/introduction.html, retrieved Oct. 30, 2018, 4 pages.
Building Blocks for Smart Buildings, BrickSchema.org, Mar. 2019, 17 pages.
Fierro et al., Why Brick is a Game Changer for Smart Buildings, Memoori Webinar, 2019, 67 pages.
International Search Report and Written Opinion on PCT/US2019/036823, dated Aug. 5, 2019, 13 pages.
Maya, Node Editor, Autodesk Knowledge Network, 2016, https://knowledge.autodesk.com/support/maya/learn-explore/caas/CloudHelp/

(56) References Cited

OTHER PUBLICATIONS cloudhelp/2016/ENU/Maya/files/GUID-23277302-6665-465F-8579-9BC734228F69-htm.html, retrieved Oct. 30, 2018, 6 pages.
Metadata Schema for Buildings, 3 pages, Brickschema.org (Cannot confirm date.).

* cited by examiner

SYSTEM AND METHODS FOR ENTITY VISUALIZATION AND MANAGEMENT WITH AN ENTITY NODE EDITOR

CROSS-REFERENCE TO RELATED PATENT APPLICATIONS

This application is a Continuation of U.S. application Ser. No. 16/175,507, filed Oct. 30, 2018, incorporated herein by reference in its entirety.

BACKGROUND

The present disclosure relates generally to building management systems. The present disclosure relates more particularly to visualizing entities associated with building management systems.

A user may operate a system to manage a number of entities. The system may include a large number of related entities. The system can display the large number of related entities as a graphical user interface (GUI). As the number of related entities increases, the GUI can be difficult for the system to display and the user to understand.

A hierarchical tree structure is one method to abstract the relationships between entities and specify the most relevant entities. However, a hierarchical tree structure can traditionally only support one dimension of complexity.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

SUMMARY

Figure 1:
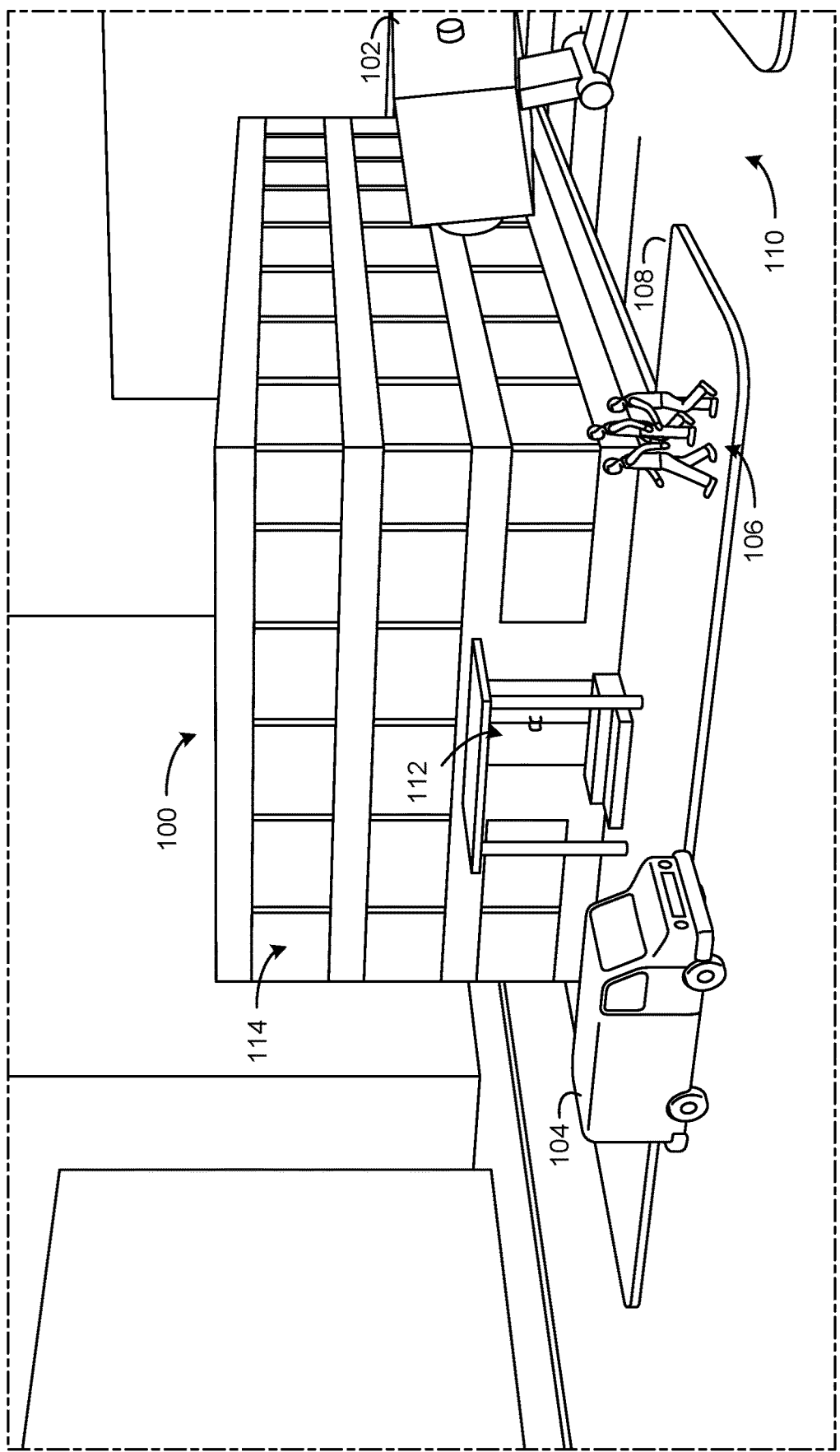
FIG. 1 is a schematic perspective view drawing of a building with a security system, according to an exemplary embodiment.

A method for visualizing and managing entities and connections between entities based on a graphical user interface (GUI) node editor, the method includes constructing an entity datablock, wherein the entity datablock is a data structure describing an entity and includes entity descriptive information, an entity category, an entity name, entity relationships, and an entity identifier. The method includes establishing the entity relationships as bi-directional relationships, the bi-directional relationships link two disparate entities. The method includes representing the entity datablock as a node and the bi-directional relationships as lines connecting two nodes. The node includes at least one of the entity descriptive information, the entity category, or the entity name. The method further includes receiving, by a system to implement a new entity datablock, from the user device, a request to create the new entity datablock. The method includes generating, by the system to implement the new entity datablock, an entity identifier for the new entity datablock. The method includes instantiating, by an entity database, a new data structure element with the entity identifier. The entity database includes a number of data structure elements. The method includes storing, by the entity database, in the new data structure element, entity information. The entity information includes entity descriptive information, an entity category, an entity name, and entity relationships.

The method of establishing the entity relationships further includes linking the two disparate entities with a pair of unique identifiers. The pair of unique identifiers are associated with the two disparate entities and are stored in the entity datablock of each of the two disparate entities.

The method of representing the entity datablock as a node further includes displaying an interactive GUI element that allows a user to edit the entity datablock associated with the node. The method of representing the bi-directional relationships as lines further includes displaying an interactive GUI element that allows a user to edit the entity relationships of the two disparate entities.

The GUI node editor further includes one or more graphical interactive elements that form a digital representation of one or more physical entities. The one or more physical entities further includes an object that is able to be controlled by the GUI node editor. The GUI node editor is configured to control the one or more physical entities.

A GUI node editor for visualizing and managing entities and connections between entities. The GUI node editor includes, representations of one or more physical entities, one or more user devices, and one or more memory devices configured to store instructions that, when executed on one or more processors, cause the one or more processors to construct an entity datablock. The entity datablock is a data structure describing an entity and includes entity descriptive information, an entity category, an entity name, entity relationships, and an entity identifier. The instructions cause the one or more processors to establish the entity relationships as bi-directional relationships. The bi-directional relationships link two disparate entities. The instructions cause the one or more processors to represent the entity datablock as a node and the bi-directional relationships as lines connecting two nodes. The node includes at least one of the entity descriptive information, the entity category, or the entity name.

The instructions cause the one or more processors to construct the entity datablock by receiving from the one or more user devices, a request to create a new entity datablock. The instructions cause the one or more processors to construct the entity datablock by generating an entity identifier for the new entity datablock and instantiating a new data structure element with the entity identifier. The entity database includes a number of data structure elements. The instructions cause the one or more processors to construct the entity datablock by storing in the new data structure element, entity information. The entity information includes entity descriptive information, an entity category, an entity name, and entity relationships.

The instructions cause the one or more processors to establish the entity relationships by linking the two disparate entities with a pair of unique identifiers. The pair of unique identifiers are associated with the two disparate entities and are stored in the entity datablock of each of the two disparate entities. The instructions cause the one or more processors to represent the entity datablock as a node by displaying an interactive GUI element that allows a user to edit the entity datablock associated with the node. The instructions cause the one or more processors to represent the bi-directional relationships as lines by displaying an interactive GUI element that allows a user to edit the entity relationships of the two disparate entities. The GUI node editor further includes one or more graphical interactive elements that form a digital representation of one or more physical entities. The one or more physical entities includes an object that is able to be controlled by the GUI node editor. The GUI node editor is configured to control the one or more physical entities.

A building automation system includes one or more physical entities and a GUI node editor. The GUI node editor includes one or more entity datablocks. The one or more entity datablocks are a data structure describing the one or more physical entities and include entity descriptive information, an entity category, an entity name, entity relationships, and an entity identifier. The GUI node editor includes one or more bi-directional entity relationships. The one or more bi-directional entity relationships link two disparate entities. The GUI node editor includes a number of nodes and a number of lines connecting two nodes. The number of nodes includes at least one of the entity descriptive information, the entity category, or the entity name.

DETAILED DESCRIPTION

Overview

Referring generally to the FIGURES, systems and methods for visualizing and managing entities via an entity node editor are shown, according to various exemplary embodiments. Security operators using large security monitoring systems manage a large number of physical elements. In the context of a connected building management system, the term entity is used to describe any related physical element such as a facility, building, door, floor, sensor, or other element not here listed. In the context of a building management visualization methodology, the term node can be used to describe an entity which communicably connects two or more disparate entities.

A simplified management method to visualize entities is provided. By way of example, a node could be a floor of a building which contains several rooms. Managing and visualizing the connections between entities is a difficult task because of a potentially large number of individual entities. Traditional systems that manage and visualize numerous entities, either on-location or remotely, support only one-dimensional relationships between entities and can present challenges for a security operator to use effectively. Tools that allow security operators to focus on the most relevant information about entities allow for a faster response time. Visualizing complex connections between entities will allow security operators to more effectively manage a large number of entities in a building management system.

Visualization of greater levels of complexity and bi-directional relationships for a large number of entities is achieved in some embodiments. The entity node editor can be in the form of a graphical user interface (GUI). The entity node editor provides the user with detailed, contextual information about the entities under management, the relationship between entities, the number of connected entities, and other relevant information. Only the most relevant information can be presented to the user and any duplicate relationships are collapsed in the interface. This simplifies the way information is presented, making it easier for users to focus on the most important information. The interface may provide a means for the user to view the entity details and entity relationship details for further insight or management. The entity node editor described herein can be used as part of a security monitoring system, building management system, or other system, providing detailed and relevant information, together with a direct means of managing entities and entity relationships. The system advantageously overcomes problems created by software interfaces that do not provide sufficient visualization of levels of interconnection.

Building with Security System

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 may be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 may be used by one or more vehicles 104 where the vehicles 104 may be either stationary or moving (e.g. delivery vehicles). The building 100 and parking lot 110 may be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In some embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc.

The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

In some embodiments, the security camera 102 is installed for purposes of monitoring a parking lot 110 and/or sidewalk 108 for accumulated snow. For example, the security camera may be configured to communicate with an image analysis device (e.g., convolutional neural network) to determine if the parking lot 110 or sidewalk 108 are covered with snow and accordingly require snow removal services. In such embodiments, vehicles 104 and/or pedestrians 106 could partially occlude the parking lot 110 or sidewalk 108. When the parking lot 110 and sidewalk 108 are partially occluded, it is possible that an image analysis system could inaccurately classify the parking lot 110 or sidewalk 108 as being covered in snow.

In some embodiments, the security camera 102 is configured to use an image analysis system to observe the parking lot 110 for the purpose of determining how many parking spaces are open and/or occupied. In these embodiments, pedestrians 106, snow, or some other foreign object could partially occlude the parking spaces. In some embodiments, the security camera 102 could be configured to observe the entrance(s) and/or exit(s) of building 100 for the purposes of counting the number of pedestrians 106 enter or exit the building. In this embodiment, for example, vehicles 104 might partially occlude the entrance(s) and/or exit(s) of the building 100.

A System for Entity Visualization and Management

Figure 2:
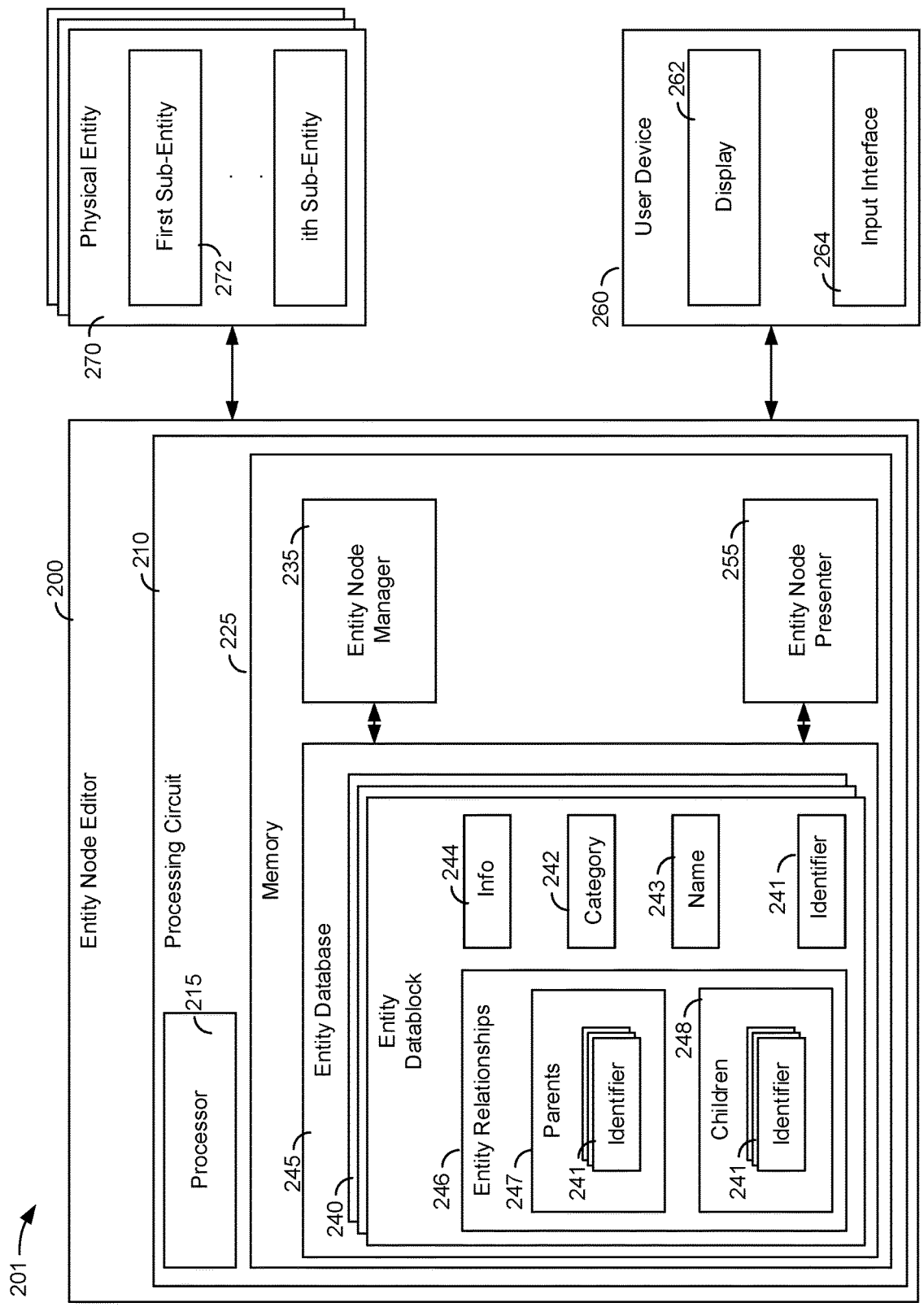
FIG. 2 is a block diagram of a system that can be configured to implement an entity node editor to visualize and manage entities of the building illustrated in FIG. 1, according to an exemplary embodiment.

Referring now to FIG. 2, a system 201 is shown, according to an example embodiment. System 201 can be configured to visualize and manage multiple entities. System 201 can be implemented for building 100 (e.g., some or all of the components of the system 201 can be on premises or remote) to automatically monitor and control various building functions and systems. System 201 is shown to include an entity node editor 200, user device 260 and one or more physical entities 270. The user device 260 may be a computer, a tablet, a phone, a smart-watch, a keypad, or any other device. The entity node editor 200 can be configured to generate a GUI visualization of the one or more physical entities 270 and allow management of said physical entities 270, as described in greater detail with further reference to FIGS. 3-7.

The user device 260 can be configured to display the GUI produced by the entity node editor 200. According to some embodiments, user device 260 may be a personal computer. However, in some embodiments, user device 260 can take other forms (e.g., a tablet, phone, controller, script, program, etc.). Additionally, in some embodiments, user device 260 can be part of entity node editor 200 (e.g., the entity node editor 200 can be implemented on the user device 260). In some embodiments, the user device 260 can be connected to the entity node editor 200. In some embodiments, user device 260 may contain a display 262. The display 262 can be configured to present information to a user in a visual format (e.g., as text, graphics, etc.). The display 262 may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 262 is configured to present visual media (e.g., text, graphics, etc.) without requiring a backlight (e.g., e-paper, etc.).

In some embodiments, user device 260 may contain input interface 264. The input interface 264 can be a touchscreen or other type of electronic display configured to receive input from a user (e.g., via a touch-sensitive panel). For example, the input interface 264 may include a touch-sensitive panel layered on top of an electronic visual display. A user can provide inputs through simple or multi-touch gestures by touching the input interface 264 with one or more fingers and/or with a stylus or pen. The input interface 264 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of input interface 264 allowing registration of touch in two or even more locations at once. In some embodiments, user device 260 may not contain input interface 264 and/or display 262.

The entity node editor 200 is shown to include a processing circuit 210. Processing circuit 210 includes processor 215 and memory 225. Processing circuit 210 can be configured to implement the functionality of the entity node editor 200. The processor 215 can be a general purpose processor, an application specific integrated circuit (ASIC), one or more field programmable gate arrays (FPGAs), a group of processing components, or other suitable electronic processing components. Processor 215 can include a memory 225.

The memory 225 can include one or more devices (e.g., memory units, memory devices, storage devices, etc.) for storing data and/or computer code for completing and/or facilitating the various processes described in the present disclosure. The memory 225 can include random access memory (RAM), read-only memory (ROM), hard drive storage, temporary storage, non-volatile memory, flash memory, optical memory, or any other suitable memory for storing software objects and/or computer instructions. The memory 225 can include database components, object code components, script components, or any other type of information structure for supporting the various activities and information structures described in the present disclosure. The memory 225 can be communicably connected to the processor 215 via the processing circuit 210 and can include computer code for executing (e.g., by the processor 215) one or more processes described herein.

The memory 225 is shown to include an entity node manager 235, an entity database 245, and an entity node presenter 255. The entity database 245 can be configured to store information associated with multiple physical entities and relationships between individual entities. The entity node manager 235 can be configured to edit information associated with individual entities stored in the entity database 245 and relationships between entities stored in the entity database 245. The entity node presenter 255 can be configured to visually display entities and relationships between entities stored in the entity database 245. The entity node presenter 255 can be configured to display the entities as nodes.

The entity database 245 can maintain data relevant to operation of the entity node editor 200. The entity database 245 can include one or more entity data structures, shown as entity datablock(s) 240. In some embodiments, the entity database 245 can be a hardware component (e.g., server, network attached storage, load balancing system, etc.). In some embodiments, the entity database 245 can be a software component (e.g., database management system, application programming interface, content management system, etc.). The entity database 245 can be communicably connected to the entity node manager 235, in some embodiments. In some embodiments, the entity database 245 is part of other components (e.g., the processor 215, the entity node editor 200, etc.), or is a separate component in part or entirely.

The one or more entity datablock(s) 240 can be configured to be digital representations of the one or more physical entities 270. The physical entities 270 can be anything illustrated in FIG. 1 (e.g., building 100, security camera 102, parking lot 110, sidewalk 108, pedestrian 106, etc.). Each individual entity datablock of the one or more entity datablock(s) 240 can correspond to an individual physical entity of the one or more physical entities 270. The one or more entity datablock(s) 240 may contain information relevant to the one or more physical entities 270 (e.g., name, location, related entities, entity category, address, employee contact information, owner, district, group affiliations, appearance, control systems, manager, description, employee list, security contacts, maintenance contacts, etc.). The one or more entity datablock(s) 240 are shown to include an entity identifier, shown as identifier 241, an entity category, shown as category 242, an entity name, shown as name 243, entity information, shown as info 244, and entity relationships 246, in some embodiments. The one or more entity datablock(s) 240 may contain a different number and type of data than those listen herein.

The identifier 241 can be configured to uniquely identify an individual entity datablock of the one or more entity datablock(s) 240. The entity node editor 200 can generate a unique individualized identifier by maintaining a list of assigned identifiers and incrementally assigning a new entity datablock with an identifier value sequentially greater than that contained in the list of assigned identifiers. By way of example, the first entity datablock may be stored with identifier value "10000" and the second entity datablock may be stored with identifier value "10001." In some embodiments, the entity node editor 200 can generate an identifier for the new entity datablock in any other manner.

The category 242 can be configured to descriptively label an individual entity datablock in the one or more entity datablock(s) 240 by the type of individual physical entity it represents (e.g., building, floor, city, room, security camera, access controller, employee, contractor, etc.). By way of example, an entity datablock representing "Building 5—Corporate South" could be given the category "Building." Category 242 can be manually entered by a user from user device 260, can be assigned by entity node editor 200, or can be generated by any other method.

Name 243 can be configured to descriptively identify an individual entity datablock in the one or more entity datablock(s) 240 by the title of the individual physical entity it represents. The entity node editor 200 can label displayed entities by the associated name contained in the corresponding individual entity datablock. By way of example, a physical entity named "Building 5—Corporate South" could be given name 243 "Building 5—Corporate South" which would be displayed by entity node editor 200 as the name of the node representing the physical entity. Further examples of name 243 used as a node display by entity node editor 200 can be found in FIGS. 3-7.

Info 244 can be configured to include information describing an individual entity datablock in the one or more entity datablock(s) 240. Info 244 can be manually entered by a user from the user device 260, can be assigned by entity node editor 200, or can be generated by another method not here mentioned. Info 244 can include names, locations, related entities, entity categories, addresses, employee contact information, owners, districts, group affiliations, physical appearance, control systems, manager, description, employee list, security contacts, maintenance contacts, or other information not here listed.

Entity relationships 246 can be configured to represent interconnections between disparate one or more entity datablock(s) 240. The entity relationships 246 can include parent entities, shown as parents 247, and child entities, shown as children 248. The entity relationships 246 can include a different number and/or type of relationship than those listed. The entity relationships 246 can be manually entered by a user from the user device 260, can be assigned by the entity node editor 200, or can be generated by another method not here mentioned. The entity relationships 246 are described in more detail in relation to FIGS. 3-7.

Parents 247 can be configured to contain a list of one or more identifier(s) 241 of one or more entity datablock(s) 240 at a greater hierarchy level than that of the specific entity datablock containing the parents 247. By way of example, an entity datablock representing a room in a building can contain the identifier of the entity datablock representing the building that the room exists inside of within the list of parents. The parents 247 can be manually entered by a user from user device 260, can be assigned by entity node editor 200, or can be generated by another method not here mentioned. The parents 247 are described in more detail in relation to FIGS. 3-7.

Children 248 can be configured to contain a list of one or more identifier(s) 241 of one or more entity datablock(s) 240 at a lower hierarchy level than that of the specific entity datablock containing the children 248. By way of example, an entity datablock representing a building containing rooms may contain the identifiers of the entity datablocks representing the rooms contained in the building within the list of children. The children 248 can be manually entered by a user from user device 260, can be assigned by the entity node editor 200, or can be generated by another method not here mentioned. The children 248 are described in more detail in relation to FIGS. 3-7.

The entity node manager 235 can be configured to edit the one or more entity datablock(s) 240. In some embodiments, the entity node manager 235 is part of other components (e.g., the processor 215, the entity node editor 200, etc.), or can be a separate entity entirely. In some embodiments, the entity node manager 235 can be a hardware component (e.g., server, desktop computer, cluster, azure, AWS, controller, network manager, gateway, bridge, etc.), while in some embodiments, the entity node manager 235 can be a software component (e.g., database handler, object code, script, etc.). The entity node manager 235 can be communicably connected to the one or more physical entities 270 through the entity node editor 200, in some embodiments. In some embodiments, the entity node manager 235 can be communicably connected to the entity database 245 through the processing circuit 210.

The entity node presenter 255 can be configured to visually display, on the user device 260, the one or more entities contained in the entity database 245. In some embodiments, the entity node presenter 255 displays the one or more entities as GUI nodes described in more detail with relation to FIGS. 3-7. In some embodiments, the entity node presenter 255 displays the one or more entities in another layout not here mentioned. In some embodiments, the entity node presenter 255 is part of other components (e.g., the processor 215, the entity node editor 200, etc.), or can be a separate entity entirely. In some embodiments, the entity node presenter 255 can be a hardware component (e.g., server, desktop computer, cluster, azure, AWS, controller, network manager, gateway, bridge, etc.), while in some embodiments, the entity node presenter 255 can be a software component (e.g., database handler, object code, script, etc.). The entity node presenter 255 can be communicably connected to the user device 260 through the entity node editor 200, in some embodiments. In some embodiments, the entity node presenter 255 can be communicably connected to the entity database 245 through the processing circuit 210.

The one or more physical entities 270 can be configured to be tangible objects as part of a building. The one or more physical entities 270 can be anything illustrated in FIG. 1 (e.g., the building 100, the security camera 102, the parking lot 110, the sidewalk 108, the pedestrian 106, etc.). The one or more physical entities 270 can be a physical hardware element (e.g., ingress card reader, security camera, access controller, retina scanner, fingerprint reader, etc.) and/or a traditionally non-physical element (e.g., biometric analysis, social media analysis, facial-recognition, license plate analyzer, etc.). The one or more physical entities 270 can be doors, stairs, windows, rooms, chairs, computers, furniture, floors, phones, cabinets, thermostats, heating units, security cameras, art, trash, trash cans, silverware, faucets, bathrooms, elevators, employees, software, passwords, security codes, routers, servers, switches, carpet, sensors, building controllers, boilers, chillers, roof top units, air handler units, commercial stores, vendors, machines, equipment, vehicles, exhaust ports, roofs, or other elements not here mentioned. The one or more physical entities 270 can be configured to interact with the entity node editor 200 to provide data or perform actions.

In some embodiments, the one or more physical entities 270 can be coupled to the entity node editor 200. In some embodiments, the one or more physical entities 270 can include multiple sub-entities, the first of which is shown as first sub-entity 272. The first sub-entity 272 can be configured to be any of the elements described above in reference to the one or more physical entities 270. The first sub-entity 272 can be an entity at a lower hierarchy level than that of the one or more physical entities 270 which contain the first sub-entity 272. The first sub-entity 272 may contain sub-entities of its own which may contain further levels of sub-entities. By way of example, a physical entity could be a building which contains sub-entities "room 1," "room 2," and "room 3," which each respectively contain sub-entities "chair 1," "desk 2," and "computer 3," and "computer 3" could contain sub-entity "Microsoft Office subscription registration key 4."

GUI Elements of an Entity Node Editor

Figure 3:
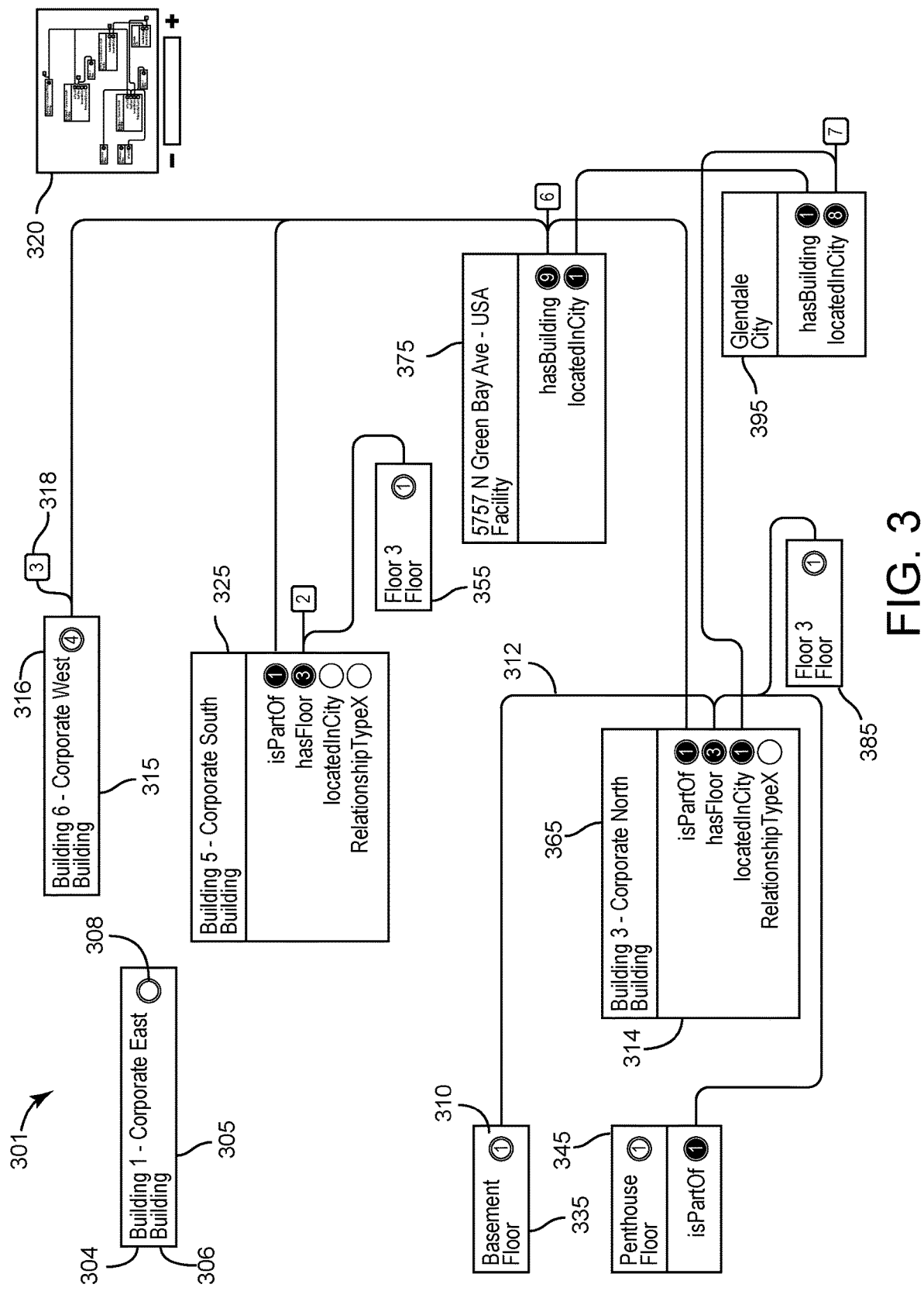
FIG. 3 is an interface generated by the entity node editor illustrated in FIG. 2, the interface including multiple entities visualized as nodes, according to an exemplary embodiment.

Referring now to FIG. 3, an overview of an entity node editor interface 301 is shown, according to an exemplary embodiment. The entity node editor interface 301 can be configured to allow a user to visualize and manage connected entities. The entity node presenter 255 can manage the entity node editor interface 301. The entity node editor interface 301 can be organized into elements within the interface. In some embodiments, the entity node editor interface 301 may contain nodes that represent entities, shown as nodes 305-395. Each node (e.g., node 305, node 315, node 325, etc.) can be associated with a specific entity datablock in the entity database 245 of FIG. 2. Each node (e.g., node 305, node 315, node 325, etc.) may be identified by a name 304 and/or a category 306. The name 304 and/or the category 306 can be respectively associated with the name 243 and the category 242 of FIG. 2. Any node that is not connected to another node (e.g., node 305, etc.) may display a blank connection element 308. A node that is not connected to another node (e.g., node 305, etc.) may be associated with an entity datablock that contains no entity relationships 246. In some embodiments, a node that that is connected to other nodes (e.g., node 315, node 325, etc.) displays the number of connections in the connection element 310. The number of connections in the connection element 310 may be computed by the entity node editor 200 by summing the numeric quantity of the identifiers 241 contained in the parents 247 and/or the children 248 of the respective specific entity datablock 240 for which the number of connections is sought. Lines between nodes, for example the line 312, represent entity relationships associated with the entity relationships 246 of FIG. 2. Lines between nodes may be differentiable (e.g., may display in a different color, line thickness, line style, etc.) based on the type of relationship represented (e.g., parent relationship, child relationship, etc.). In some embodiments, relationships between nodes (e.g., line 312, etc.) represent bi-direction relationships. In some embodiments, a user may select a node containing relationships (e.g., node 315, node 325, etc.) to display an expanded view 314 including the type of relationship. In some embodiments, the relationship types may include, "isPartOf," "hasFloor," "locatedinCity," and "RelationshipTypeX." In some embodiments, the relationship types may be of other types not here listed and may differ depending on the physical entity the entity node editor 200 is representing. Connections between nodes (e.g., line 312, etc.) can be descriptive. By way of example, a node representing a floor entity could connect through a "isPartOf" connection relationship to a node representing a building entity through a "hasFloor" connection relationship. In some embodiments, a user may select to view a sub-group of the entire list of entity nodes related to a node. Connection element 316 can display the total number of connected nodes and hidden connection 318 can display the number of hidden nodes. Thumbnail view 320 can display an overview of the entire entity node editor 301.

Figure 4:
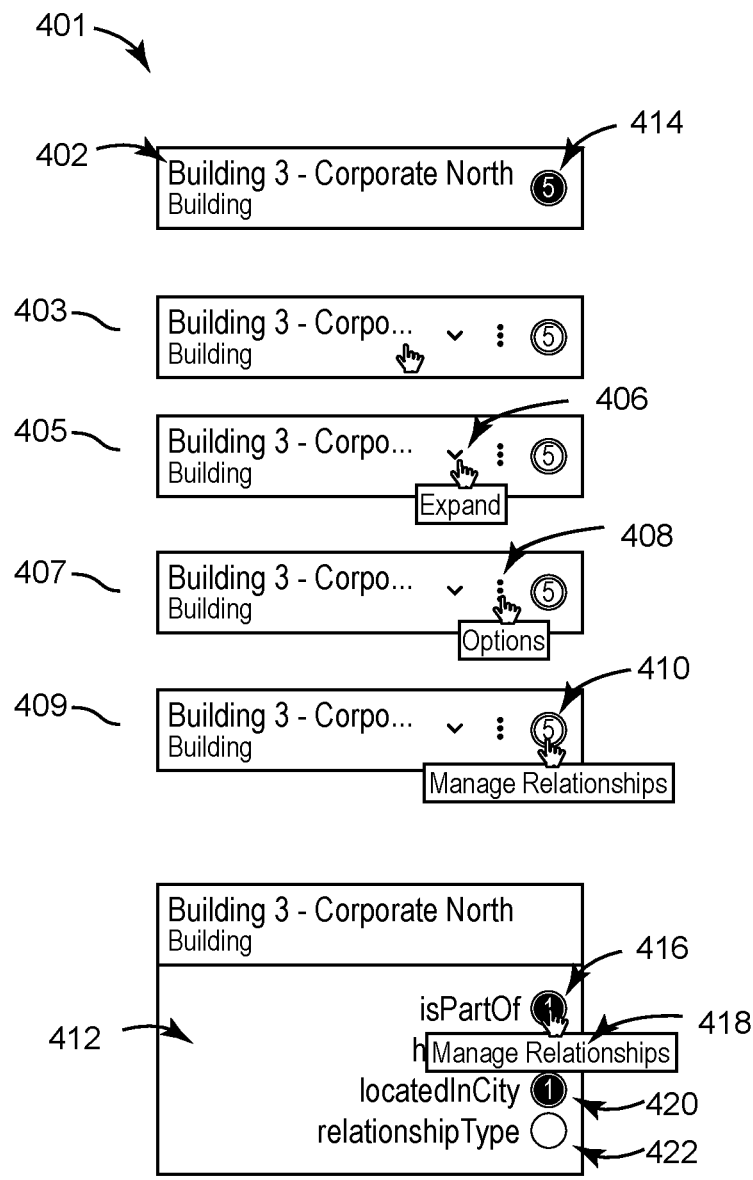
FIG. 4 is a schematic drawing of a menu interaction of the interface illustrated in FIG. 3, including multiple interactive elements, according to an exemplary embodiment.

Referring now to FIG. 4, a schematic drawing 401 of a menu interaction with the entity node editor interface 301 is shown, according to an exemplary embodiment. The schematic drawing 401 of elements of the entity node editor interface 301 includes node 402. The node 402 can correspond to the node 365 of FIG. 3 and/or can represent any other node. Extended controls may be revealed by a user moving a selection pointer over the entity node 402, as shown in view 403. In some embodiments, extended controls are revealed by a user positioning a finger above the entity node 402 as with a touch screen device. Extended controls may be revealed in response to other actions not here mentioned. In view 405, selection of expand icon 406 can display relationship menu 412.

The relationship menu 412 can be displayed in response to other actions not here mentioned. The relationship menu 412 may contain relationship elements "isPartOf," "hasFloor," "locatedInCity," "relationshipType," and/or other elements not here listed. Selection of an element (e.g., "locatedInCity," "relationshipType," etc.) within the relationship menu 412 can display a relationship management tool described in more detail with reference to FIG. 5. In view 407, selection of options icon 408 can display an options menu for the specific entity node. The options menu may contain action options "hide from view," "edit properties," "delete," and/or other action options not here mentioned. In view 409, selection of manage relationships icon 410 can display the relationship management tool described in more detail with reference to FIG. 5.

The node 402 is shown to include an element 414 that indicates the number of existing relationships between the node 402 and other nodes. The element 414 includes the number "5" indicating that five different relationships exist between the node 402 and other entities. The relationship menu 412, when expanded, further describes which of the five relationships exist with other nodes. The relationship menu 412 can indicate what types of relationships, and their number, exist with other nodes. For example, element 416 indicates that one of the five relationships is an "isPartOf" relationship, element 418 indicates that three of the five relationships are "hasFloor" relationships, while element 420 indicates that one of the five relationships is an "locatedInCity" relationship. Element 422 includes no number indication since none of the existing relationships of the node 402 are "relationshipType" relationships.

Figure 5:
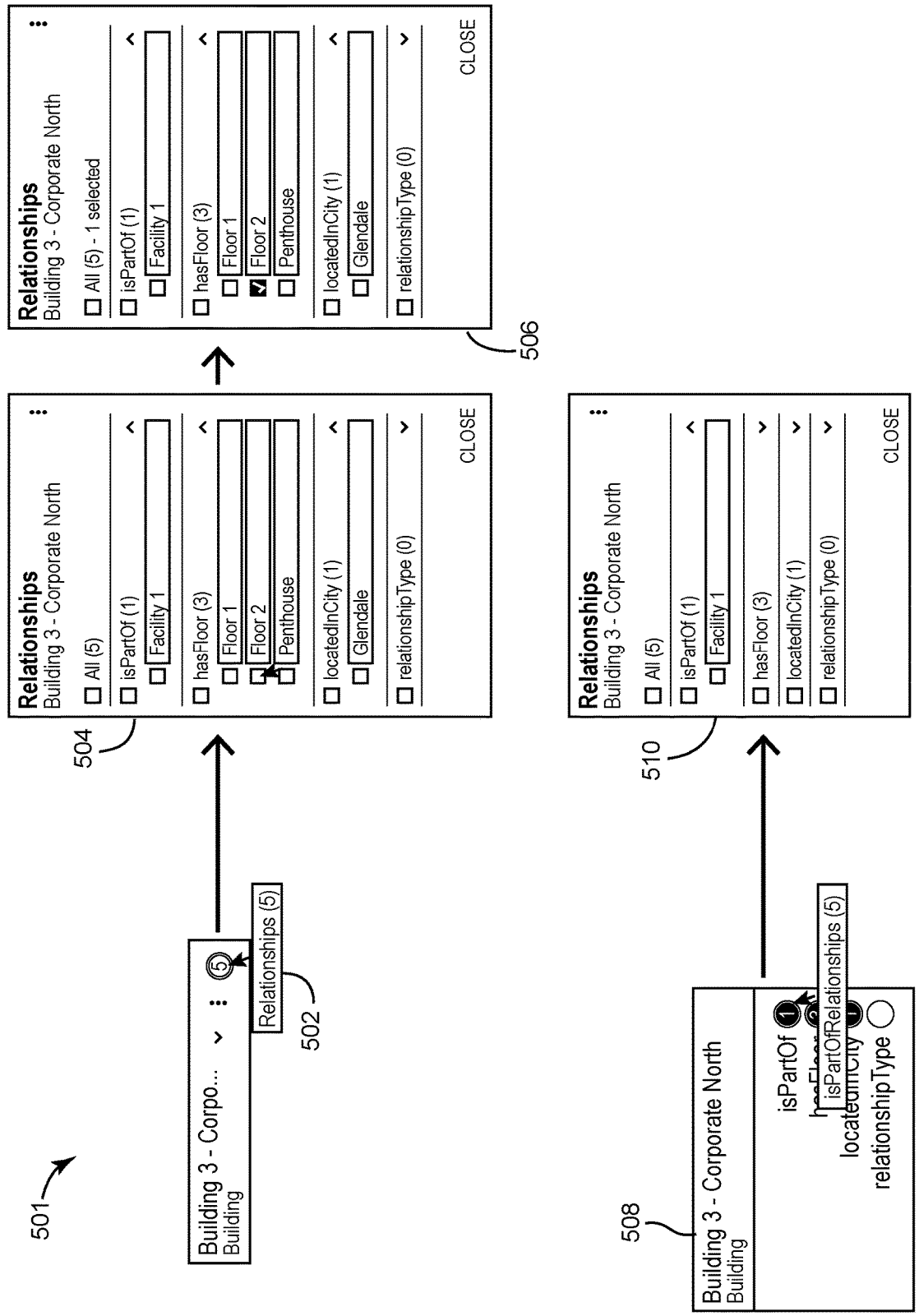
FIG. 5 is a schematic drawing of a relationship management interaction with the interface illustrated in FIG. 3, including multiple interactive relationship elements, according to an exemplary embodiment.

Referring now to FIG. 5, a schematic drawing of elements of the entity node editor interface 301 illustration relationship management interactions is shown, according to an exemplary embodiment. Relationship management tool 504 can be displayed in response to selection of connection display element 502. In some embodiments, the relationship management tool 504 can be displayed in response to other actions not here mentioned. The relationship management tool 504 can be configured to modify the relationships contained in the entity relationships 246 of the specific entity datablock corresponding to the node (e.g., node 305, node 315, node 325, etc.) selected (e.g., as shown with connection display element 502, etc.).

In some embodiments, the relationship management tool 504 can be configured to aid in visualizing the relationships of the specific node selected. A user may define the type of relationship between two nodes, as shown in action 506. In some embodiments, selection of the expand icon 406 and a relationship type, shown in view 508 (e.g., "isPartOf," "hasFloor," etc.), can display the existing entity connections in a category list format 510. In some embodiments, category list format 510 can include a list of the relationships associated with the entity node ordered by relationship element category. Relationship element categories can be defined by a user, the entity node editor 200, or by another means not here mentioned. Management of entity relationships, as shown in action 506, can update the one or more identifier(s) 241 contained in the one or more entity datablock(s) 240 of the associated entity nodes.

Figure 6:
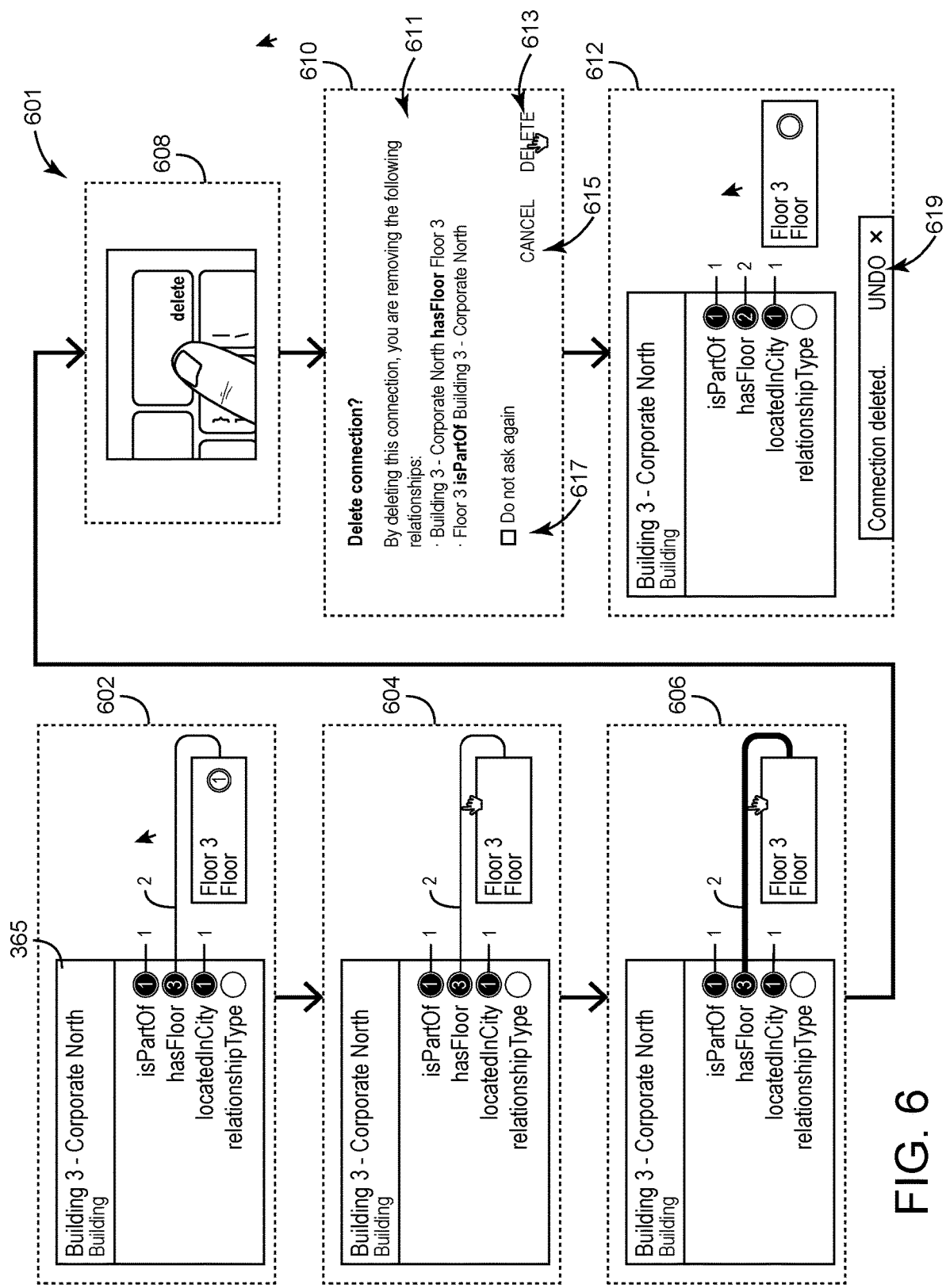
FIG. 6 is a flow diagram of a process of relationship management that can be performed by the entity node editor illustrated in FIG. 2, the flow diagram including interface elements of the interface of FIG. 3, according to an exemplary embodiment.

Referring now to FIG. 6, a flow diagram of a process 601 for relationship deletion interactions with the entity node editor interface 301 is shown, according to an exemplary embodiment. The process 601 may remove the one or more identifier(s) 241 from the one or more entity datablock(s) 240 associated with a node (e.g., node 305, node 315, node 325, etc.). In some embodiments, the steps of the process 601 may cause the entity node presenter 255 to update the entity node editor interface 301 of FIG. 3. The process 602 may occur in response to other actions not here listed. In some embodiments, the entity node manager 235 can be configured to perform the process 601. However, in some embodiments, other components can be configured to perform the process 601. The entity node editor 200 can be configured to perform the process 601. Furthermore, any computing device as described herein can be configured to perform the process 601.

In step 602, the entity node presenter 255 displays a connection between entity nodes as described in greater detail with reference to FIG. 3. In some embodiments, the node 365 contains five relationships displayed as lines between nodes. The connection element 316 can display the total number of connected nodes and the hidden connection 318 can display the number of hidden nodes.

In step 604, the entity node presenter 255 allows the user to select the connection line between entity nodes. The entity node presenter 255 can receive the selection of the connection line from the user device 262. The entity node presenter 255 may display connections between entity nodes in another manner not here mentioned. In some embodiments, the entity node presenter 255 is configured to select relationships connections in another manner not here mentioned.

In step 606, the entity node presenter 255 can change the display state of the connection line between entity nodes in response to being selected by a user. In some embodiments, the connection line changes color (e.g., may display as blue, green, red, yellow, etc.), changes line weight, changes line style, or otherwise adjusts the display of the connection line to signal that the connection line has been selected.

In step 608, the entity node presenter 255 can receive an indication from the user device 260 to delete the selected relationship of the step 602. In some embodiments, the indication is generated by the user device 260 in response to a user interacting with a virtual or physical button. For example, a user may press a delete key to generate the indication to delete the relationship connection selected by the user in the step 602. In some embodiments, a backspace key, or another input not here mentioned may serve to delete the relationship connection.

In step 610, the entity node presenter 255 can display an action confirmation dialog element 611. The action confirmation dialog element 611 may provide a user with an indication of the deletion action of the relationship selected in the step 602 that the user is about to perform and request input from the user to confirm that the user wishes to proceed with deletion of the relationship selected in the step 602. In some embodiments, the action confirmation dialog element 611 may include elements including a header, "Delete connection?" body text, "By deleting this connection, you are removing the following relationships: <entity name 1><relationship element category><entity name 2>" and interactive elements "Do not ask again" 617, "CANCEL" 615, and "DELETE" 613.

In some embodiments, the action confirmation dialog element 611 may contain other elements not here mentioned. Selection of the interactive element "Do not ask again" 617 can configure the entity node presenter 255 to skip the step 610 in future relationship deletion interactions. Selection of the interactive element "CANCEL" 615 can cause the entity node editor 200 to stop the relationship deletion interaction 601 and return to a default display. Selection of the interactive element "DELETE" 613 can cause the entity node presenter 255 to remove the corresponding one or more identifier(s) 241 from the associated one or more entity datablock(s) 240. In some embodiments, the relationship deletion interaction 601 may cause the entity node presenter 255 to update the entity node editor interface 301 of FIG. 3.

In step 612, the entity node presenter 255 can update the entity node editor interface 301 to reflect the deleted relationship connection. The entity node editor interface 301 can remove the connection line between entity nodes. In some embodiments, the node 365 now contains four relationships displayed as lines between nodes. The connection element 316 can display the total number of connected nodes and the hidden connection 318 can display the number of hidden nodes. In some embodiments, an "undo" 619 prompt is displayed by the entity node presenter 255 until the next user action.

Figure 7:
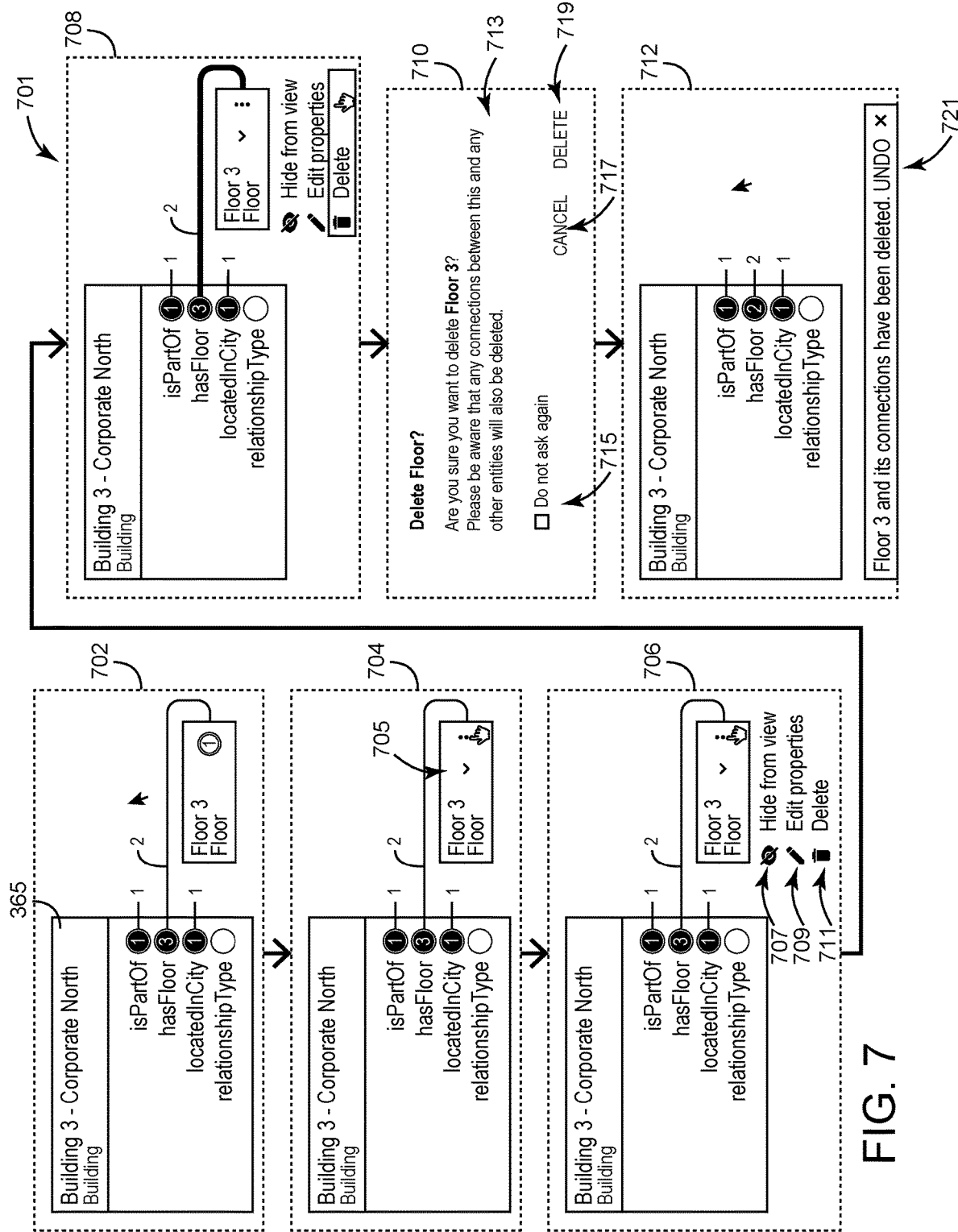
FIG. 7 is a flow diagram of a process of entity management that can be performed by the entity node editor illustrated in FIG. 2, the flow diagram including interface elements of the interface of FIG. 3, according to an exemplary embodiment.

Referring now to FIG. 7, a flow diagram of process 701 for entity deletion interactions that are performed with elements of the entity node editor interface 301 is shown, according to an exemplary embodiment. The process 701 may remove the one or more entity datablock(s) 240 associated with a node (e.g., node 305, node 315, node 325, etc.) from the entity database 245. In some embodiments, the entity deletion interaction 701 may cause the entity node presenter 255 to update the entity node editor interface 301 of FIG. 3. The entity deletion interaction 701 may occur in response to other actions not here listed. In some embodiments, the entity node manager 235 can be configured to perform the process 701. However, in some embodiments, other components can be configured to perform the entity deletion interaction 701. The entity node presenter 255 can be configured to perform the entity deletion interaction 701. Furthermore, any computing device as described herein can be configured to perform the process 701.

In step 702, the entity node presenter 255 can cause the user device 262 to display one or more nodes and one or more connections between nodes. Nodes and node connections are described in greater detail with reference to FIG. 3. In some embodiments, the node 365 contains five relationships displayed as lines between nodes. The connection element 316 can display the total number of connected nodes and the hidden connection 318 can display the number of hidden nodes.

In step 704, the entity node presenter 255 can allow the user to select the options icon on the entity node. The entity node presenter 255 can receive an indication of the selection of the entity node 705 from the user device 260. The entity node presenter 255 may be configured to perform the steps 706-712 in response to performing the step 704.

In step 706, the entity node presenter 255 can display an options menu in response to selection of the options icon on the entity node by a user. In some embodiments, the node changes color (e.g., may display as blue, green, red, yellow, etc.), changes display stroke, or otherwise adjusts the display of the entity node selected. In some embodiments, the options menu may contain elements including, "Hide from view" 707, "Edit properties" 709, "Delete" 711, or other elements not here listed. Selection of the element "Hide from view" 707 can hide the entity as part of the hidden elements. Selection of the element "Edit properties" 709 can display the relationship management tool 504 of FIG. 5. Selection of the element "Delete" 711 can delete the entity node. In some embodiments, a backspace key, or another input not here mentioned may serve to delete the entity node. In step 708, the entity node presenter 255 can be configured to allow the user to select the "Delete" 711 entity of the options menu.

In step 710, the entity node presenter 255 can be configured to display an action confirmation dialog element 713. In some embodiments, the action confirmation dialog element 713 may contain elements including a header, "Delete <entity name>?" body text, "Are you sure you want to delete <entity name>? Please be aware that any connections between this and any other entities will also be deleted." and interactive elements "Do not ask again" 715, "CANCEL" 717, and "DELETE" 719. In some embodiments, the action confirmation dialog element 713 may contain other elements not here mentioned. Selection of the interactive element "Do not ask again" 715 can configure the entity node presenter 255 to skip the step 710 in future entity deletion interactions. Selection of the interactive element "CANCEL" 717 can cause the entity node presenter 255 to stop the entity deletion interaction 701 and return to a default display. Selection of the interactive element "DELETE" 719 can cause the entity node presenter 255 to remove the entity datablock corresponding to the selected entity node from the entity database 245 and remove all references to the identifier 241 of the deleted entity datablock 240. In some embodiments, the entity deletion interaction 701 may cause the entity node presenter 255 to update the entity node editor interface 301 of FIG. 3.

In step 712, the entity node presenter 255 can be configured to update the entity node editor interface 301 to reflect the deleted entity node. The entity node editor interface 301 can remove the connection line between entity nodes. In some embodiments, the node 365 now contains four relationships displayed as lines between nodes. The connection element 316 can display the total number of connected nodes and the hidden connection 318 can display the number of hidden nodes. In some embodiments, an "undo" prompt 721 is displayed by the entity node presenter 255 until the next user action.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system of a building comprising one or more storage devices having instructions stored thereon that, when executed by one or more processors, cause the one or more processors to:
cause a storage device to store a graph comprising a plurality of nodes representing a plurality of entities of the building and a plurality of relationships between the plurality of nodes representing relationships between the plurality of entities of the building;
cause a user interface of a user device to display at least a portion of the graph;
receive, via the user device, a first user input via the user interface indicating a new node for the graph;
cause the user interface to display an element including a plurality of available relationship types and receive, via the element, a second user input selecting a new relationship type for a new relationship between the new node and another node of the graph from the plurality of available relationship types of the element;
update the graph based on the first user input and the second user input;
receive, via the user device, a selection of one node of the plurality of nodes;
identify, based on the graph, one or more relationships of the plurality of relationships between the one node and other nodes of the plurality of nodes; and
cause a display device of the user device to display, an indication of the one or more relationships.

2. The building system of claim 1, wherein the instructions cause the one or more processors to receive an edit to a particular node or a particular relationship, wherein the edit is creation of the particular node or the particular relationship or deletion of the particular node or the particular relationship.

3. The building system of claim 1, wherein the plurality of entities of the building comprise at least one of building equipment, spaces, or people.

4. The building system of claim 1, wherein each of the plurality of relationships logically defines a particular relationship between a first data entity of the plurality of entities and a second data with one or more words or phrases, the one or more words or phrases comprising a predicate.

5. The building system of claim 1, wherein the instructions cause the one or more processors to:
identify the plurality of available relationship types of a set of relationship types for the one node, wherein the plurality of available relationship types are relationships available for the one node with second nodes of the plurality of nodes; and
cause the display device of the user device to display, a second indication of the plurality of available relationship types.

6. The building system of claim 1, wherein the instructions cause the one or more processors to:
receive, via the user device, a second selection of one relationship of the plurality of relationships;
receive a second indication to delete the one relationship; and
update the graph by removing the one relationship from the plurality of relationships in response to receiving the second indication to delete the one relationship.

7. The building system of claim 1, wherein the instructions cause the one or more processors to:
receive a second indication to delete the one node; and
update the graph by removing the one node from the plurality of nodes in response to receiving the second indication to delete the one node.

8. The building system of claim 1, wherein the instructions cause the one or more processors to receive an input including the new relationship between a first existing node of the plurality of nodes and a second existing node of the plurality of nodes;
wherein the instructions cause the one or more processors to update the graph by causing the new relationship to be added between the first existing node of the plurality of nodes and the second existing node of the plurality of nodes.

9. The building system of claim 1, wherein the instructions cause the one or more processors to receive an input including the new relationship, the new node, and a request to add the new relationship between the new node and an existing node of the plurality of nodes;
wherein the instructions cause the one or more processors to update the graph by causing the new node to be added to the graph and causing the new relationship to be added between the new node and the existing node.

10. A method of viewing and editing a building graph, the method comprising:

causing, by one or more processing circuits, a storage device to store the building graph comprising a plurality of nodes representing a plurality of entities of a building and a plurality of relationships between the plurality of nodes representing relationships between the plurality of entities of the building;

causing, by the one or more processing circuits, a user interface of a user device to display at least a portion of the building graph;

receiving, by the one or more processing circuits, via the user device, a first user input via the user interface indicating a new node for the building graph;

causing, by the one or more processing circuits, the user interface to display an element including a plurality of available relationship types and receiving, by the one or more processing circuits, via the element, a second user input selecting a new relationship type for a new relationship between the new node and another node of the building graph from the plurality of available relationship types of the element;

updating, by the one or more processing circuits, the building graph based on the first user input and the second user input;

receiving, by the one or more processing circuits, via the user device, a selection of one node of the plurality of nodes;

identifying, by the one or more processing circuits, the plurality of available relationship types of a set of relationship types for the one node, wherein the plurality of available relationship types are relationships available for the one node with other nodes of the plurality of nodes; and causing, by the one or more processing circuits, a display device of the user device to display, an indication of the plurality of available relationship types.

11. The method of claim 10, wherein the plurality of entities of the building comprise at least one of building equipment, spaces, or people.

12. The method of claim 10, wherein each of the plurality of relationships logically defines a particular relationship between a first data entity of the plurality of entities and a second data with one or more words or phrases, the one or more words or phrases comprising a predicate.

13. The method of claim 10, further comprising:
identifying, by the one or more processing circuits, based on the building graph, one or more relationships of the plurality of relationships between the one node and second nodes of the plurality of nodes; and causing, by the one or more processing circuits, the display device of the user device to display, a second indication of the one or more relationships.

14. The method of claim 10, further comprising:
receiving, by the one or more processing circuits, via the user device, a second selection of one relationship of the plurality of relationships;

receiving, by the one or more processing circuits, a second indication to delete the one relationship; and updating, by the one or more processing circuits, the building graph by removing the one relationship from the plurality of relationships in response to receiving the second indication to delete the one relationship.

15. The method of claim 10, further comprising:
receiving, by the one or more processing circuits, a second indication to delete the one node; and updating, by the one or more processing circuits, the building graph by removing the one node from the plurality of nodes in response to receiving the second indication to delete the one node.

16. The method of claim 10, further comprising receiving, by the one or more processing circuits, an input including the new relationship between a first existing node of the plurality of nodes and a second existing node of the plurality of nodes;

wherein the method further comprises updating, by the one or more processing circuits, the building graph by causing the new relationship to be added between the first existing node of the plurality of nodes and the second existing node of the plurality of nodes.

17. The method of claim 10, further comprising receiving, by the one or more processing circuits, an input including the new relationship, the new node, and a request to add the new relationship between the new node and an existing node of the plurality of nodes;

wherein the method further comprises updating, by the one or more processing circuits, the building graph by causing the new node to be added to the building graph and causing the new relationship to be added between the new node and the existing node.

18. One or more storage devices configured to store instructions thereon that, when executed by one or more processing circuits, cause the one or more processing circuits to:

store a building graph comprising a plurality of nodes representing a plurality of entities of a building and a plurality of relationships between the plurality of nodes representing relationships between the plurality of entities of the building;

cause a user interface of a user device to display at least a portion of the building graph;

receive via the user device, a first user input via the user interface indicating a new node for the building graph;

cause the user interface to display an element including a plurality of available relationship types and receive, via the element, a second user input selecting a new relationship type for a new relationship between the new node and another node of the building graph from the plurality of available relationship types of the element;

update the building graph based on the first user input and the second user input;

receive via the user device, a selection of one node of the plurality of nodes;

identify the plurality of available relationship types of a set of relationship types for the one node, wherein the plurality of available relationship types are relationships available for the one node with other nodes of the plurality of nodes; and cause a display device of the user device to display, an indication of the plurality of available relationship types.

19. The one or more storage devices of claim 18, wherein the plurality of entities of the building comprise at least one of building equipment, spaces, or people.

20. The one or more storage devices of claim 18, wherein each of the plurality of relationships logically defines a particular relationship between a first data entity of the plurality of entities and a second data with one or more words or phrases, the one or more words or phrases comprising a predicate.

* * * * *